(12) United States Patent
Utukuri et al.

(10) Patent No.: US 8,969,769 B2
(45) Date of Patent: Mar. 3, 2015

(54) TWO-DIMENSIONAL POSITION SENSING SYSTEMS AND SENSORS THEREFOR

(75) Inventors: Avanindra Utukuri, Mississauga (CA); Jonathan Clarke, North York (CA); Stephen McFadyen, Toronto (CA)

(73) Assignee: Baanto International Ltd., Mississauga (CA)

( * ) Notice: Subject to any disclaimer, the term of this patent is extended or adjusted under 35 U.S.C. 154(b) by 39 days.

(21) Appl. No.: 13/329,192

(22) Filed: Dec. 16, 2011

(65) Prior Publication Data

US 2012/0261548 A1    Oct. 18, 2012

Related U.S. Application Data

(63) Continuation of application No. PCT/CA2010/000883, filed on Jun. 16, 2010.

(60) Provisional application No. 61/187,651, filed on Jun. 16, 2009.

(51) Int. Cl.
| | |
|---|---|
| G01C 21/00 | (2006.01) |
| G06F 3/042 | (2006.01) |
| G01D 5/34 | (2006.01) |
| G01S 3/784 | (2006.01) |
| G01S 5/16 | (2006.01) |
| G06F 3/0354 | (2013.01) |

(52) U.S. Cl.
CPC ............ *G06F 3/0428* (2013.01); *G01D 5/34* (2013.01); *G01S 3/784* (2013.01); *G01S 5/16* (2013.01); *G06F 3/03542* (2013.01); *G06F 3/0421* (2013.01)
USPC .................. 250/206.1; 345/175; 345/173

(58) Field of Classification Search
USPC ................................. 250/206.1; 345/175, 173
See application file for complete search history.

(56) References Cited

U.S. PATENT DOCUMENTS

| | | | |
|---|---|---|---|
| 3,951,550 | A | 4/1976 | Slick |
| 4,507,557 | A | 3/1985 | Tsikos |
| 4,874,937 | A | 10/1989 | Okamoto |
| 4,973,156 | A | 11/1990 | Dainis |
| 5,166,668 | A | 11/1992 | Aoyagi |
| 5,455,415 | A | 10/1995 | Yamada |

(Continued)

FOREIGN PATENT DOCUMENTS

| | | | |
|---|---|---|---|
| EP | 0 121 840 A2 | 10/1984 | |
| EP | 0 121 840 A3 | 10/1986 | |

(Continued)

OTHER PUBLICATIONS

International Preliminary Report on Patentability for PCT/CA2010/000883, published Dec. 16, 2011.

(Continued)

*Primary Examiner* — Tony Ko

(57) ABSTRACT

Two dimensional position sensing system and sensors for use in such systems are disclosed. The sensors incorporate linear array sensors having sensor elements and an aperture plate. Some embodiments include a radiation source that directs radiation onto some of the sensor elements. Other embodiments including radiation blocking objects that block radiation from reaching some of sensor elements. The direction or position of the radiation source or radiation blocking object may be estimated from the radiation incident on the sensor elements.

25 Claims, 7 Drawing Sheets

(56) References Cited

U.S. PATENT DOCUMENTS

| | | | |
|---|---|---|---|
| 5,757,478 A | 5/1998 | Ma | |
| 6,141,104 A | 10/2000 | Schulz et al. | |
| 6,538,644 B1 | 3/2003 | Muraoka | |
| 6,862,087 B2 | 3/2005 | Kuroda et al. | |
| 8,139,045 B2 * | 3/2012 | Jang et al. | 345/175 |
| 8,432,377 B2 * | 4/2013 | Newton | 345/175 |
| 2005/0007504 A1 | 1/2005 | Fergason | |
| 2006/0165312 A1 | 7/2006 | O'Dell | |

FOREIGN PATENT DOCUMENTS

| | | |
|---|---|---|
| JP | 61-125640 A | 6/1986 |
| JP | 07036603 A | 2/1995 |
| JP | 2001-265515 A | 9/2001 |
| JP | 2002163071 A | 6/2002 |
| JP | 2004-199181 A | 7/2004 |
| JP | 2004-110184 A | 8/2004 |
| JP | 2005-128693 A | 5/2005 |
| WO | 03/038468 A2 | 5/2003 |
| WO | 03/038468 A3 | 11/2003 |
| WO | 2004/081502 A2 | 9/2004 |
| WO | 2004/081502 A3 | 11/2004 |
| WO | 2005/026930 A2 | 3/2005 |
| WO | 2005/026930 A3 | 10/2005 |
| WO | 2009/029767 A1 | 3/2009 |

OTHER PUBLICATIONS

Written Opinion of the ISR for PCT/CA2010/000883, published Nov. 16, 2010.

* cited by examiner

TWO-DIMENSIONAL POSITION SENSING SYSTEMS AND SENSORS THEREFOR

FIELD

The described embodiments relate to systems and methods for sensing the position of a radiation source or a radiation blocking object in two dimensions. The embodiments also relate to sensors for use in such systems and methods.

SUMMARY

Some embodiments of the invention provide sensors for estimating the direction of an object relative to the sensor. A radiation source emits generated or reflected radiation towards a sensor. The sensor has a linear optical sensor array behind an aperture plate. The sensor array has a plurality of sensor elements arranged linearly. The aperture plate has an aperture to allow radiation from the radiation source to reach only some of the sensor elements when the system is in use. An intensity signal from the sensor is coupled to a processor which is configured to identify sensor elements upon which the radiation is incident. A center sensor element is chosen from among the illuminated sensor elements and is used to estimate the direction of the radiation source relative to the sensor.

Other embodiments provide a sensor that has a linear array sensor. A plurality of radiation sources is provided to illuminate a range of sensor elements in a linear array sensor. The radiation from each radiation source passes through an aperture in an aperture plate and illuminates only some of the sensor elements. A radiation blocking element is used to block radiation from some of the radiation sources from reaching some of the sensor elements. The absence of radiation reaching the sensor elements is measured and is used to estimate the direction of the radiation blocking element relative to the sensor.

In another aspect, a pair of sensors is provided. The sensors are positioned in a known spacing relative to one another. Each sensor determines the direction of a radiation source (in some embodiments) or a radiation blocking object (in other embodiments) relative to the sensor. The position of the radiation source or radiation blocking object is estimated based on the direction of the source or object from each sensor and the known relative positioning of the sensors.

Another aspect provides a method of estimating the direction of a radiation source positioned in a sensing region, the method comprising: providing a radiation sensor, the radiation sensor comprising: a linear array sensor having a plurality of sensor elements, the sensor elements facing the sensing region; an aperture plate positioned between the linear array sensor and the sensing region to block radiation from the sensing region from reach the linear array sensor; and an aperture formed in the aperture plate to allow radiation from the radiation source to reach some of the sensor elements; receiving an intensity signal from the linear array sensor, wherein the intensity signal includes intensity values corresponding to radiation incident on the sensor elements through the aperture; and determining the direction based on the intensity signal.

In some embodiments, the radiation intensity signal includes at least one high intensity value exceeding a threshold value, and wherein the direction is determined based on the at least one high intensity value.

In some embodiments, the radiation intensity signal includes a range of high intensity values exceeding a threshold value, and wherein determining the direction includes: selecting a center sensor element based on the range of high intensity values; and determining a direction based on the center sensor element.

In some embodiments, the radiation intensity signal includes at least one low intensity value below a threshold value, and wherein the direction is determined based on the at least one low intensity value.

In some embodiments, the radiation intensity signal includes a range of low intensity values below a threshold value, and wherein determining the direction includes: selecting a center sensor element based on the range of low intensity values; and determining a direction based on the center sensor element.

In some embodiments, the radiation intensity signal is an analog signal and wherein determining the direction includes: converting the analog radiation intensity signal into a corresponding final radiation intensity; and determining a direction based on the final radiation intensity signal.

In some embodiments, the radiation intensity signal is a digital signal having either a high value or a low value corresponding to each of the sensor elements and wherein determining the direction includes: selecting a center sensor element based on a range of high intensity values; and determining a direction based on the center sensor element.

In some embodiments, the radiation intensity signal is a digital signal having either a high value or a low value corresponding to each of the sensor elements and wherein determining the direction includes: selecting a center sensor element based on a range of low intensity values; and determining a direction based on the center sensor element.

In some embodiments, the radiation intensity signal may be filtered to remove spurious values before determining the direction.

In some embodiments, determining the direction includes looking up an angle in a lookup table.

In some embodiments, determining the direction includes calculating an angle.

Another aspect provides a method of estimating the position of a radiation source relative to a sensing region, the method comprising: positioning a first position sensor in a first position relative to the sensing region; positioning a second position sensor in a second position relative to the plane, wherein the first and second position sensors are separated by a distance; determining a first ray relative to first position sensor; determining a second ray relative to the second position sensor; and estimating the position of the radiation source to be at the intersection of the first and second rays.

In some embodiments, the sensing region is a surface of a display screen.

In some embodiments, the sensing region is a surface of a writing surface.

In some embodiments, the radiation source is an active radiation source that emits radiation detectable by the first and second position sensors.

In some embodiments, the radiation source is a passive reflective radiation and further including providing one or more active radiation sources in a fixed position, and wherein the passive radiation source reflects radiation from the active radiation sources onto the first and second position sensors.

In some embodiments, the sensing region is a surface of a display screen.

In some embodiments, the sensing region is a surface of a writing surface.

Another aspect provides a method of estimating the position of a radiation source relative to a sensing region, the method comprising: providing a plurality of active radiation sources adjacent the sensing region; positioning a first position sensor in a first position relative to the sensing region wherein radiation emitted by at least some of the radiation sources is incident upon the first radiation sensor; positioning a second position sensor in a second position relative to the plane wherein radiation emitted by at least some of the radiation sources is incident upon the second radiation sensor, and wherein the first and second position sensors are separated by a distance; determining a first ray relative to first position sensor; determining a second ray relative to the second position sensor; and estimating the position of the radiation source to be at the intersection of the first and second rays.

In some embodiments, the radiation from a first group of active radiation sources is blocked from reaching the first position sensor and radiation from a second group of radiation sources is blocked from reaching the second radiation sensor and wherein the first ray corresponds to the first group and the second ray corresponds to the second group.

Another aspect provides a position sensor comprising: a linear array sensor having a plurality of sensor elements arranged linearly, the sensor elements facing a sensing region; an aperture plate positioned between the linear array sensor and the sensing region to block radiation from the sensing region from reaching the linear array sensor; and an aperture formed in the aperture plate to allow radiation from the sensing region to reach some of the sensor elements.

In some embodiments, the sensor includes a processor coupled to the linear array sensor to receive a radiation intensity signal from the linear array sensor, wherein the radiation intensity signal corresponds to the intensity of radiation incident on a range of sensor elements through the aperture.

In some embodiments, the sensor includes an optical filter to filter radiation reaching the sensor elements.

In some embodiments, the sensor elements are sensitive to radiation emitted by a radiation source in the sensing region and wherein the optical filter is selected to allow radiation emitted by the radiation source to reach the sensor elements.

In some embodiments, the sensing region is generally planar and wherein the sensor elements are linearly arranged generally parallel to the sensing region.

In some embodiments, the processor is configured to estimate a direction relative to the position sensor in response to the radiation intensity signal.

These and other aspects of the invention are described below in a description of the some example embodiments of the invention.

BRIEF DESCRIPTION OF THE DRAWINGS

Various embodiments of the invention will now be described with reference to the drawings, in which.

The drawings are illustrative only and are not drawn to scale.

DESCRIPTION OF EXEMPLARY EMBODIMENTS

Exemplary embodiments described herein provide details relating to optical sensor systems and methods for determining the position of a radiation source or radiation blocking object. Other exemplary embodiments describe details of whiteboard systems for tracking the movement of a pen or other object on a whiteboard surface. The radiating source may radiate radiation generated by the radiation source or may reflect radiation from other sources. The radiation may be in the visible light spectrum or in other radiation spectrums, such as the ultraviolet or infrared spectrums. The embodiments described herein are exemplary only and other implementations and configurations of optical sensors are also possible.

Figure 1:
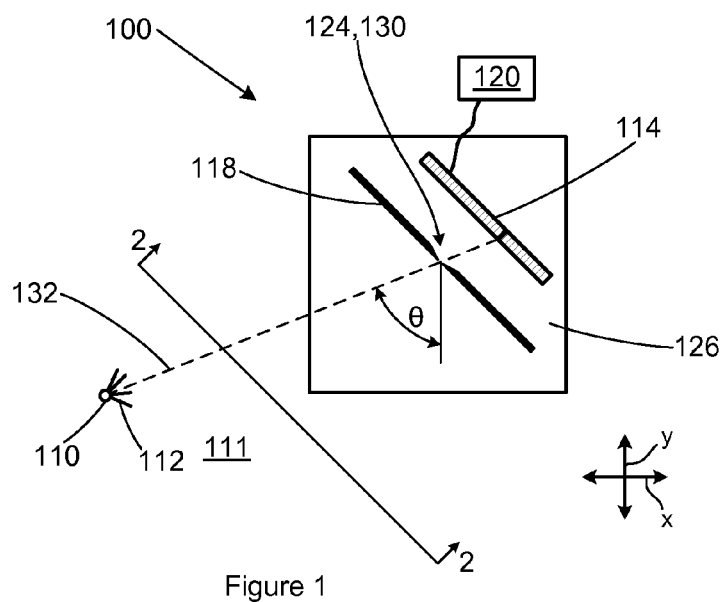
FIG. 1 illustrates a sensor according to the present invention.
Figure 2:
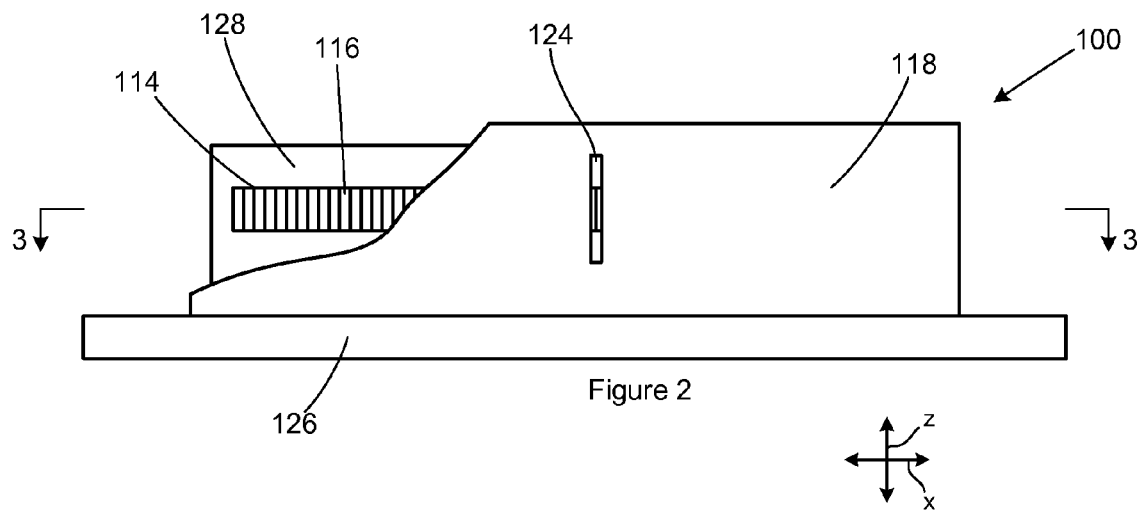
FIG. 2 is a partial cut-away front view of the sensor of FIG. 1.
Figure 3:
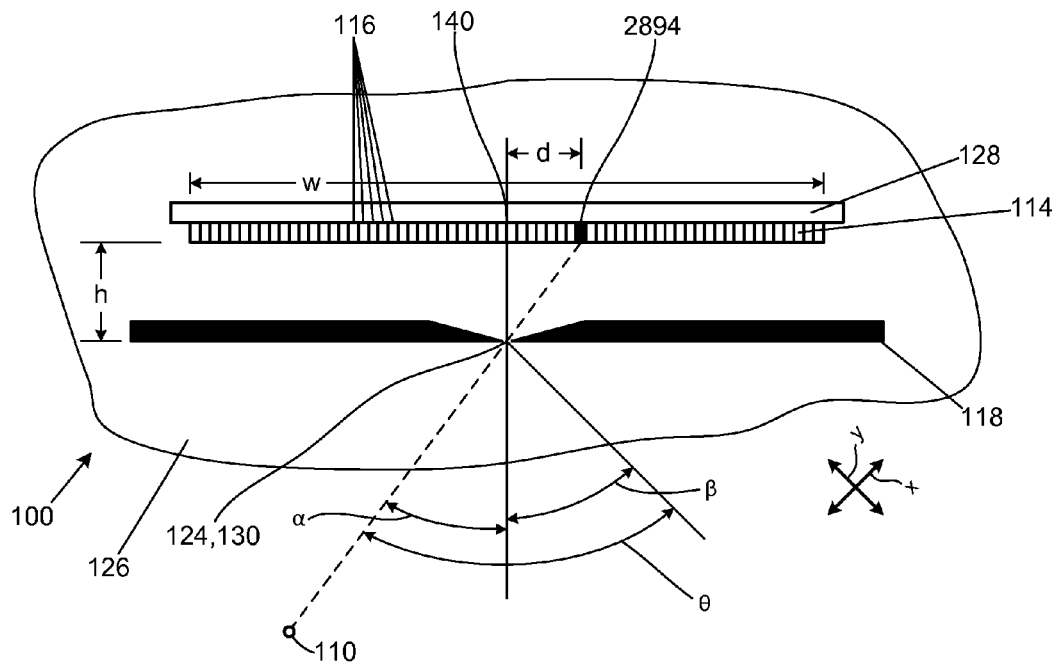
FIG. 3 is a cross-sectional top-view of the sensor of FIG. 1.

Reference is first made to FIGS. 1, 2 and 3, which illustrate a position sensor 100 and a radiation source 110. Radiation source 110 emits radiation 112 that is incident on the sensor 100. A radiation source is described herein as emitting radiation regardless of whether the radiation source simply reflects radiation produced by another radiation source or the radiation source generates radiation which then propagates away from the radiation source. In some embodiments, radiation source 110 may be a passive source which reflects radiation initially produce by another radiation source. For example, radiation source may be a reflective source that simply reflects radiation towards sensor 100. In some embodiments, radiation source 110 may be an active radiation source such as a LED, a light bulb or other source.

Sensor 100 includes a linear sensor array 114, an aperture plate 118 and a processor 120. Linear sensor array 114 is mounted on a sensor support 128, which is in turn mounted on a base plate 126. The aperture plate 118 is also mounted on base plate 126.

Sensor array 114 has a plurality of sensor elements 116 that are arranged linearly. Each of the sensor elements 116 is sensitive to radiation emitted by radiation source 110. For example, sensor array 114 may be a linear CMOS sensor that is sensitive to visible or infra-red radiation emitted by radiation source 110. Sensor array 114 is coupled to processor 120. Sensor array 114 provides a intensity signal 122 to the processor 120.

Aperture plate 118 has an aperture 124 formed in it such that radiation emitted by radiation source 110 is incident on only some of the sensor elements 116. In this embodiment, aperture 124 is a slit, allowing the radiation source 110 to be moved in the z dimension and still emit radiation onto sensor 100 through aperture 124. In other embodiments, the aperture may be a hole or may have another shape. In some embodiments, the shape (including the size) of the aperture may be selected based on the sensitivity, shape and spacing of the sensor elements 116.

The sensing region 111 is the range of space in which a radiation source 110 can emit radiation that will be incident on a sensing element 116 through the aperture 124. The sensor elements 116 are arranged generally parallel to the plane of the sensing region 111. As radiation source 110 moves in the x or y dimensions relative to sensor 100, radiation emitted by the radiation source 110 passes through aperture 124 and is incident on different sensor elements 116.

In some embodiments, an optical filter may be used to limit the frequency band of radiation incident on the sensor array 114. Referring to FIGS. 2 and 3, an optical filter may be positioned in front of aperture 124 (as shown in FIG. 2), or between aperture 124 and the sensor array 114 to reduce the amount of extraneous radiation reaching sensor element 116. For example, a filter may allow only radiation in a frequency range corresponding to radiation emitted by the radiation source 110 to reach the sensor elements 116. In some embodiments, an optical notch filter may be used to block undesirable radiation from reaching the sensor elements 116. Using an optical filter can improve the operation of sensor 100, for example, by increasing the signal-to-noise ratio in an intensity signal.

Figure 4:
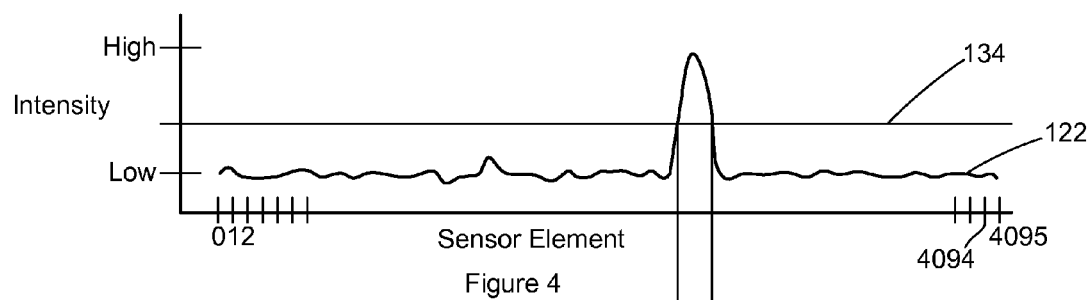
FIG. 4 illustrates an intensity signal from the sensor of FIG. 1.

FIG. 4 illustrates an example intensity signal 122. Intensity signal 122 is an analog signal provided by sensor array 114. Intensity signal 122 generally has a low intensity level corresponding to most sensor elements 116 on which little or no radiation from radiation source 110 is incident. Intensity signal 122 has a relatively high intensity level corresponding to sensor elements 116 upon which radiation from radiation source 110 is incident.

In various embodiments, the dimensions and spacing of the sensor elements 116 and the aperture 124 may be such that only one or a few sensor elements 116 may have radiation from radiation source 110 incident upon them. In other embodiments, the aperture 124 may be shaped to allow radiation from radiation source 110 to be incident on a larger number of sensor elements.

Figure 5:
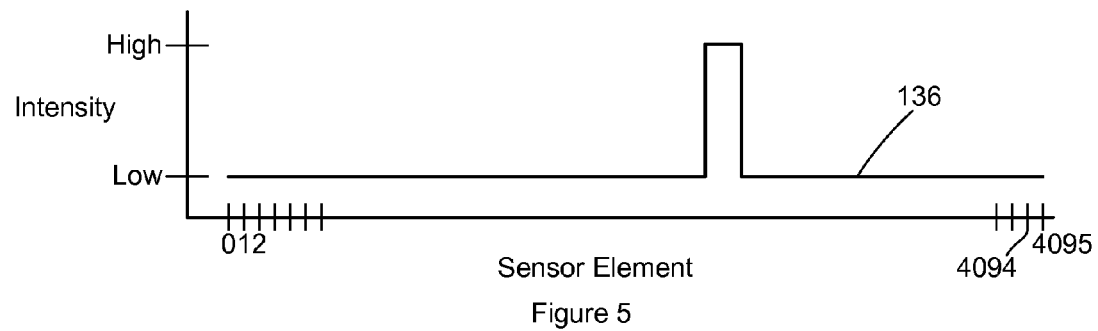
FIGS. 5 and 6 illustrate other example intensity signals.
Figure 6:
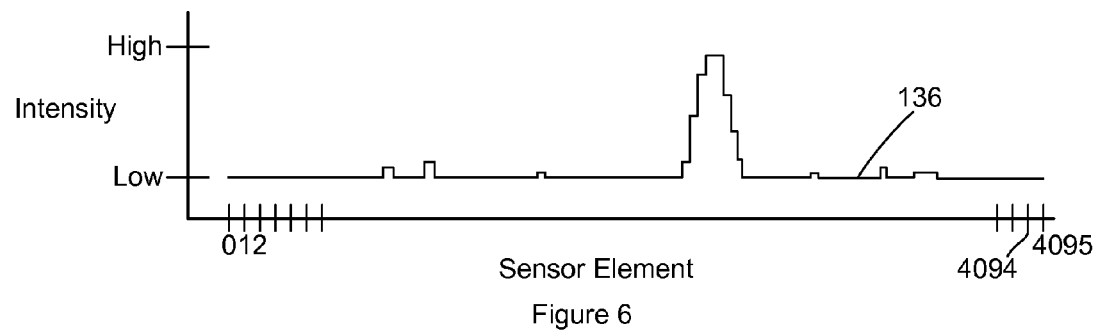

In various embodiments, the intensity signal 122 may be an analog signal or a digital signal (or a combination of both). In embodiments in which the intensity signal is a digital signal, intensity levels corresponding to specific array elements may have two or more values. For example, FIG. 5 illustrates an intensity signal 122 in which intensity levels are at either a high level or a low level depending on whether the radiation incident on each sensor element is below or above a threshold. In other embodiments, the intensity of the radiation incident on each sensor element may be reported as an intensity level within a range of values. For example, FIG. 6 illustrates an intensity signal in which an intensity level between a low value and a high value is provided for each sensor element. The low value may be 0 and the high value may be 255, if eight bits are provided for reporting the intensity level for each sensor element.

Figure 7:
FIG. 7 illustrates a final intensity signal based on the signal of FIG. 4.

Referring again to FIG. 4, in this embodiment, intensity signal 122 is a raw intensity signal that is converted into a final intensity signal 136 by processor 120. In this embodiment, processor 120 is configured to do so in the following manner. Processor 120 first estimates a threshold value for distinguishing between background levels of radiation and higher levels of radiation emitted by radiation source 110. This may be done for example, by identifying the most common intensity level (a modal value) and setting the threshold at a level between than the modal intensity level and the peak levels of the raw intensity signal. The raw intensity signal 122 may be a bi-modal signal and the threshold may be set at a level between the two modal values. In other embodiments, this may be done by calculating the average intensity level (a mean value, which will typically be between the background radiation level and the level of radiation emitted by the radiation source 110. In other embodiments, the threshold level may be selected in another manner. A threshold level 134 is calculated in this example as follows:

Threshold Level 134=(Peak Intensity Level−Average Intensity Level)*30%+Average Intensity Level Referring to FIGS. 4 and 7, the final intensity signal 136 has a high intensity for sensor elements that had an intensity level exceeding the threshold 134 in the raw intensity signal and a low intensity level for sensor element that had an intensity level at or below the threshold in the raw intensity signal.

Typically, the final intensity signal 136 will have a range of intensity levels at the high level corresponding to sensor elements on which radiation from radiation source 110 is incident through aperture plate 118. In this embodiment, the processor then identifies a center sensor element in the middle of the range of sensor elements for which the final intensity signal 136 has a high level. In the example of FIGS. 4 and 7, sensor array has 4096 sensor elements and the intensity levels for sensor elements 2883 to 2905 are high in the final intensity signal 136. Sensor element 2894 is the center element, as is shown in FIG. 3.

In some embodiments, the center element may be calculated directly from the raw intensity signal. The process for selecting the center element from the final intensity signal 136 may also be used to calculate a center element directly from digital intensity signal that has only two values, as illustrated in FIG. 5. In other embodiments, the center element may be calculated in other ways. For example, if the sensor provides a range of intensity level, as shown in FIGS. 4 and 6, the processor may be configured to select the sensor element with the highest sensor intensity level. In some embodiments, the processor may filter the raw or final intensity signal to remove spurious values. For example, an intensity signal may be filtered to remove high intensity levels for one or a small number of sensor elements that are surrounded by low intensity levels. The aperture plate and the geometry of the sensor array 118 may be arranged such that radiation from the radiation source 110 will illuminate a group of sensor elements. If a small group of elements, fewer than should be illuminated by the radiation source, have a high intensity level and are surrounded by sensor elements with a low intensity level, the group of elements may be treated as having a low intensity level.

Referring again to FIG. 1, sensor 100 is positioned at a predetermined angle relative to the x-y plane. In this embodiment, sensor 100 is positioned at a 45° angle to the x and y dimensions. Processor 120 receives the intensity signal 122 and determines an angle 8 (FIG. 1) at which radiation from radiation source 110 is incident on the sensor 100.

Processor 120 determines angle θ based on the center sensor element. This may be done using a variety of geometric or computing techniques or a combination of techniques.

A geometric technique is illustrated on FIG. 3. Processor 120 determines angle θ relative to a reference point, which will typically be within the dimensions of sensor 100. In some embodiments, the reference point may be outside the dimensions of sensor 100. In the present embodiment, angle θ is determine relative to reference point 130, which is at the centre of aperture 124. The sensor array is positioned a distance h from the aperture plate with the centre 140 of the sensor array directly behind reference point 130. Center sensor element 2894 is spaced a distance d from the centre 140 of the sensor array. Angle θ may be calculated as follows:

$$\angle \theta = \angle \alpha + \angle \beta$$
$$= \tan^{-1}(d/h) + 45°$$

In some embodiments, a lookup table may be used to determine angle θ. Angle θ may be calculated in advance for every sensor element 116 in the sensor array 114 and the result may be stored in a lookup table that is accessible to processor 120. Processor 120 may then lookup angle θ after the center element has been identified.

Collectively reference point 130 and angle θ define a ray 132 along which radiation source 110 is located relative to sensor 100.

Figure 8:
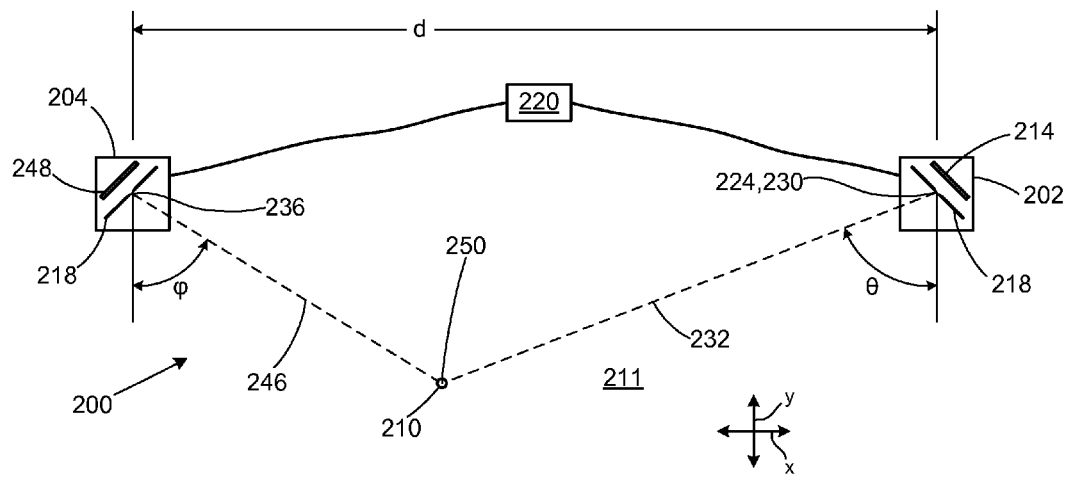
FIG. 8 illustrates a system for estimating the position of a radiation source.

Reference is next made to FIG. 8, which illustrates a system 200 for estimating the position of a radiation source 210 relative to an x-y plane. System 200 includes a pair of sensors 202 and 204, which are similar to sensor 100. Sensor 202 has a reference point 230. Ray 232 passes through reference point 230 and is at an angle θ from the y-dimension. Sensor 204 has a reference point 236. Ray 246 passes through reference point 236 and is at an angle φ relative to the y dimension. Radiation source 210 lies at the intersection of rays 232 and 246. Sensors 202 and 204 may share a processor 220 such that their respective sensor arrays 214 and 248 provide an intensity signal to the processor 220. Processor 220 calculates rays 232 and 246 in the manner described above in relation to ray 132 and FIG. 3. Processor 220 may calculate the rays in any manner, including the lookup table technique described above.

Rays 232 and 246 lies on the x-y plane. Processor 220 calculates the intersection point 250 at which rays 232 and 246 intersect. The intersection point 250 is an estimate of the position of the radiation source 210.

Figure 9:
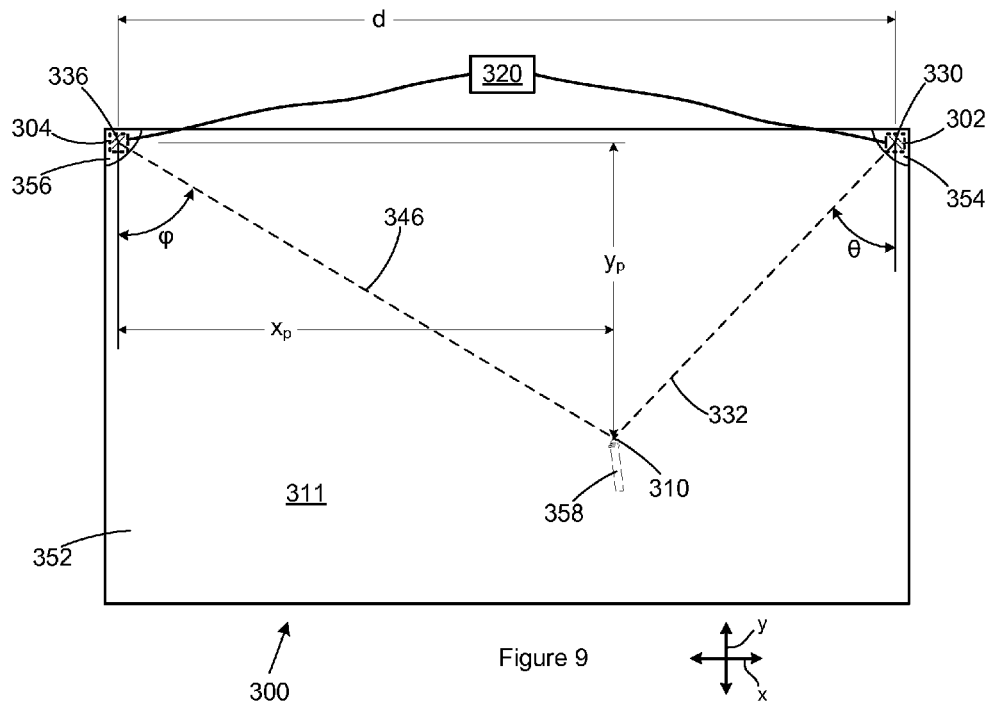
FIG. 9 illustrates a first whiteboard system according to the present invention.

Reference is next made to FIG. 9, which illustrates a whiteboard system 300. Whiteboard system 300 includes a whiteboard 352 with a pair of sensors 302 and 304. Sensors 302 and 304 are similar to sensors 202 and 204 of system 200 and operate in the same manner. Sensor 302 is mounted behind a radiation shield 354 which reduces the amount of ambient radiation that is incident on sensor 302. Similarly, sensor 304 is mounted behind a radiation shield 356. Sensing region 311 is on the surface of the whiteboard 352. Radiation source 310 is positioned in the sensing region 311. The embodiment of FIG. 9 may equally be used with a display screen to form a touchscreen or an electronic whiteboard. The sensing region 311 would be on the surface of the display screen with the sensors 302 and 304 mounted adjacent corners of the display screen. In other embodiments, the sensing region may be on the surface of another writing or display surface.

Figure 10:
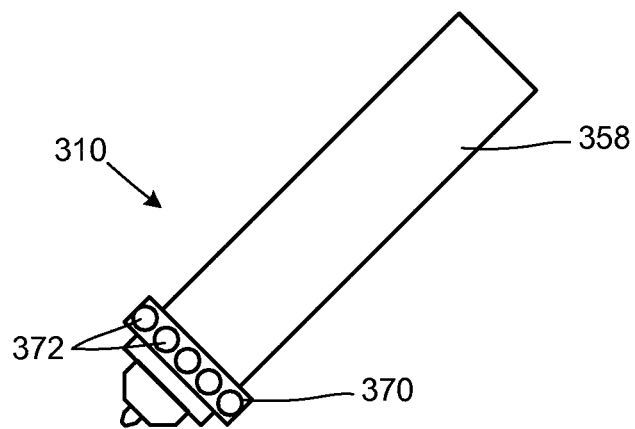
FIG. 10 illustrates a radiation source for use with the whiteboard system of FIG. 9.

Reference is made to FIG. 10. Radiation source 310 generates and emits radiation in all directions from the radiation source. Radiation source 310 is a ring 370 mounted to a dry erase pen 358 that is used to write on whiteboard 352. Ring 370 includes a plurality of LEDs 372 that are powered by a battery (not shown). Ring 370 may optionally be removable for mounting on a different dry erase pen. LEDs 372 emit radiation that is detected by sensors 302 and 304.

Referring again to FIG. 9, sensors 302 and 304 have reference points 330 and 336. Sensors 302 and 304 are separate by a distance d in the x-dimension. Reference point 336 is located at the origin of the x-y plane (that is at point (0,0)).

Reference point 330 is located at point (d,0). Radiation source 310 is located at point ($x_p$, $y_p$).

A processor 320 is coupled to sensors 302 and 304. Processor 320 calculates angles θ and φ as described above. The position of the radiation source 310 is calculated as follows:

$$x_p = \frac{d \cdot \tan\varphi}{\tan\varphi + \tan\theta}$$
$$y_p = x_p \cdot \tan\varphi$$

Processor 320 is configured to estimate to the position of radiation source 310 repetitively. As a user writes on whiteboard 352 with pen 358, the radiation source 310 moves in conjunction with the pen. Processor 320 tracks the movement of the radiation source in the x-y plane. Each calculated position is recorded, providing a record of the information written by the user on the whiteboard.

Radiation source 310 is an active radiation source, which generates and emits its own radiation. The emitted radiation may be visible light or it may be outside of the visible spectrum, so long as the sensors 302 and 304 are sensitive to the emitted radiation.

Figure 11:
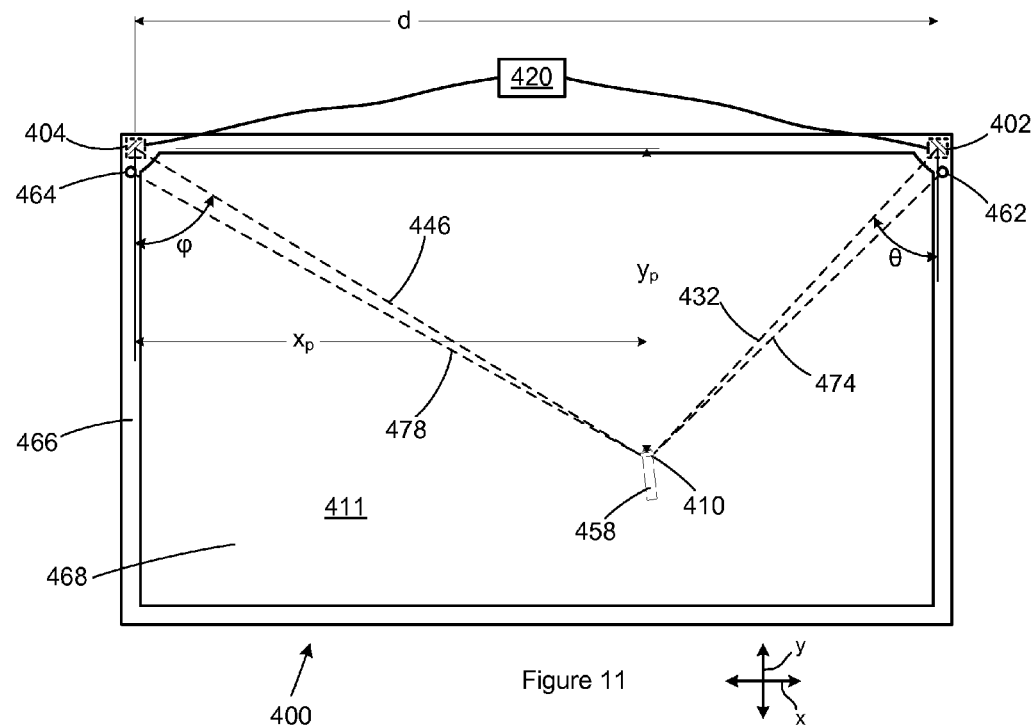
FIG. 11 illustrates a second whiteboard system according to the present invention.

Reference is next made to FIG. 11, which illustrates a whiteboard system 400, which is similar to whiteboard system 300 in structure and operation. Corresponding components are identified by similar reference numerals. Whiteboard system 400 differs from whiteboard system 300 in the nature of the radiation source 410. Radiation source 410 is a passive reflective radiation source. A pair of active fixed position radiation sources 462 and 464 are mounted in a bezel 466 of the whiteboard 452. Each radiation source emits radiation across all or most of the writing surface 468 of the whiteboard.

Figure 12:
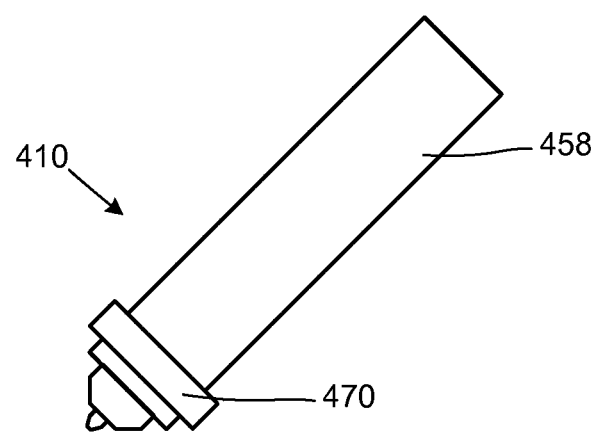
FIG. 12 illustrates a reflective radiation source for use with the present invention.

Reference is made to FIG. 12. Radiation source 410 is a reflective ring 470 mounted on a dry erase pen 458. Reflective ring 470 may be removable for mounting on a different dry-erase pen. In some embodiments, reflective ring 470 may have an outer surface covered with a reflective tape. In other embodiments, the outer surface may be a polished metal surface.

Referring again to FIG. 10, radiation emitted by active radiation source 462 is incident on radiation source 410 along line 474 and is reflected to sensor 402 along line 432. Radiation emitted by active radiation source 464 is incident on radiation source 410 along line 478 and is reflected to sensor 404 along line 446. Processor 420 is coupled to sensors 402 and 404 and estimates the position of radiation source 410 as described above in relation to whiteboard system 300. Whiteboard system 400 is able to track the movement of pen 458 without providing an active radiation source mounted to the pen. Optionally, the bezel 466 may be colored to reduce reflection of radiation from the active radiation sources 462 and 464 onto sensors 402 and 404, thereby reducing the base level of radiation that is measured by sensor elements in the sensors, and increasing the difference in intensity of radiation reflected by the radiation source 410 onto the sensors compared to background or base level radiation from other sources.

Figure 13:
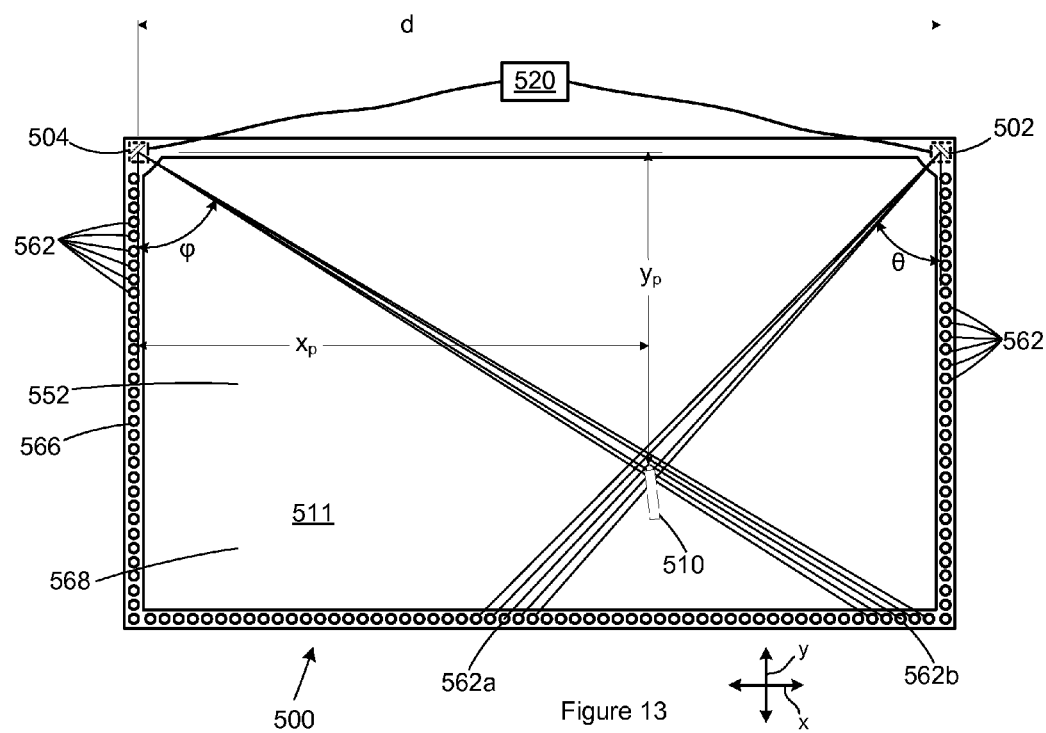
FIG. 13 illustrates a third whiteboard system according to the present invention.

Reference is next made to FIG. 13, which illustrates another whiteboard system 500. Whiteboard system 500 is similar in structure and operation to whiteboard systems 300 and 400 and corresponding components are identified by corresponding reference numerals.

Whiteboard system 500 has a plurality of active radiation emitters 562 mounted in fixed positions in the bezel 566 of the whiteboard 552. The radiation emitters 562 emit radiation that is incident on sensors 502 and 504. Sensor 502 has a plurality of sensor elements, like sensor (FIG. 3), and an aperture plate such that radiation from each of radiation emitters 562 is incident on only one or some of the sensor elements. In this embodiment, (i) the shape of an aperture 524 (not shown) in the aperture plate 518 and (ii) the spacing and intensity of the active radiation sources 562 and the divergence (or collimation) of radiation emitted by the active radiation sources may be selected such that the radiation incident upon the sensor elements is approximately equal. The spacing, intensity and divergence or collimation of the radiation sources may differ around the bezel 566. In other embodiments, the spacing, intensity or divergence or collimation, or some of these aspects may be the same for some or all of the radiation sources.

A pen (or other radiation blocking object) 510 is moved about on the writing surface 568 of the whiteboard 552. The pen blocks radiation from some of the radiation sources 562 from reaching some of the sensor elements. Radiation blocking object 510 blocks radiation from active radiation source 562a from reaching sensor 502 and radiation from active radiation source 562b from reaching sensor 504.

Figure 14:
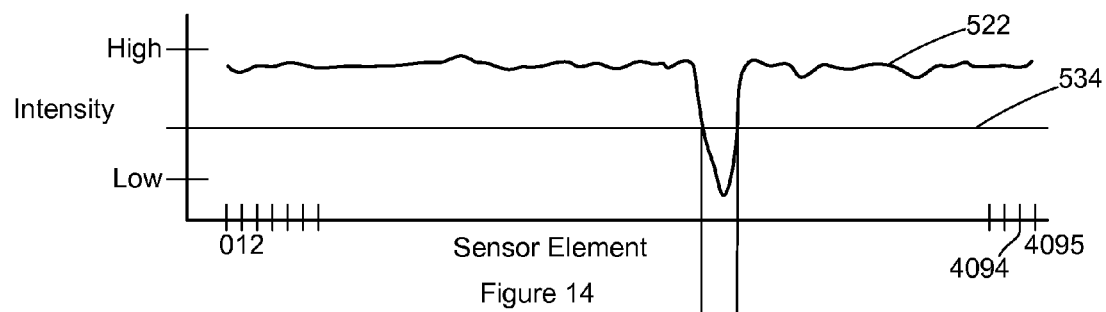
FIG. 14 illustrates an intensity signal from a sensor of the whiteboard system of FIG. 13.
Figure 15:
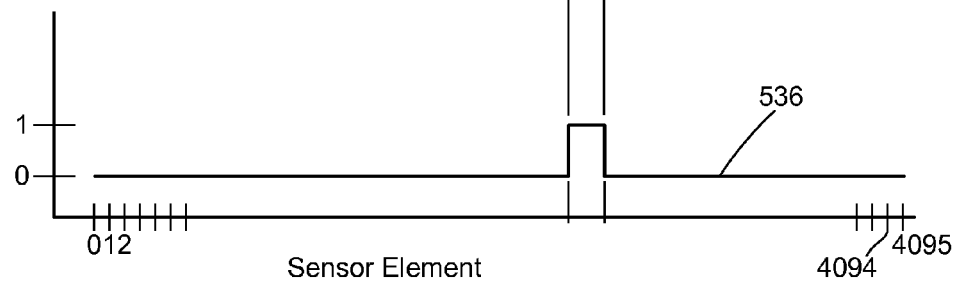
FIG. 15 illustrates a final intensity signal based on the signal of FIG. 14.

Reference is made to FIG. 14, which illustrates a raw intensity signal 522 from the sensor array 514 (not shown) of the sensor 502. Raw intensity signal 522 has a relatively high intensity level for sensor elements upon which radiation from the radiation sources 562 and has a relatively low intensity level for sensor elements upon which radiation from the radiation is blocked by pen 558. Sensors 502 and 504 are coupled to a processor 520. Referring to FIG. 15, sensor 502 determines a threshold level 534 and generates a final intensity signal 536 by comparing the raw intensity signal 522 to the threshold level 534. In FIG. 15, sensor elements that received less radiation than the threshold level have a high intensity value in the final intensity signal. The processor 520 then identifies a center sensor element based on the range of sensor elements for which final intensity signal has a high value, in the manner described above in relation to final intensity signal 136 and FIG. 7. The processor 520 then determines angle θ based on the center sensor element. Similarly, processor 520 determines angle φ and estimates the location of pen 558 based on the distance d between the sensors 502, 504, and the angles θ and φ.

Referring to FIGS. 1 to 3, sensor 100 relies on transitions from high to low radiation levels falling on different sensor elements 116. Similarly, sensors 502 and 504 (FIG. 13) rely on transitions from high to low radiation levels falling on different sensor elements 516 (not shown). The baseline or background radiation intensity level in sensor 100 is low, while in sensor 502 it is high, but both sensors operate using similar principles to determine a ray along which a radiation source or radiation blocker is located.

Whiteboard system 500 can be used with a pen or other device that blocks radiation from radiation sources 562 from reaching sensors 502 and 504, allowing the position and movement of a standard pen, a finger or other object on the whiteboard surface 568 to be estimated and tracked.

Referring again to FIGS. 13 and 14, whiteboard system 500 is configured such that the radiation intensity on each of the sensor elements in sensors 502 and 504 is approximately equal in the absence of any radiation blocking device.

Figure 16:
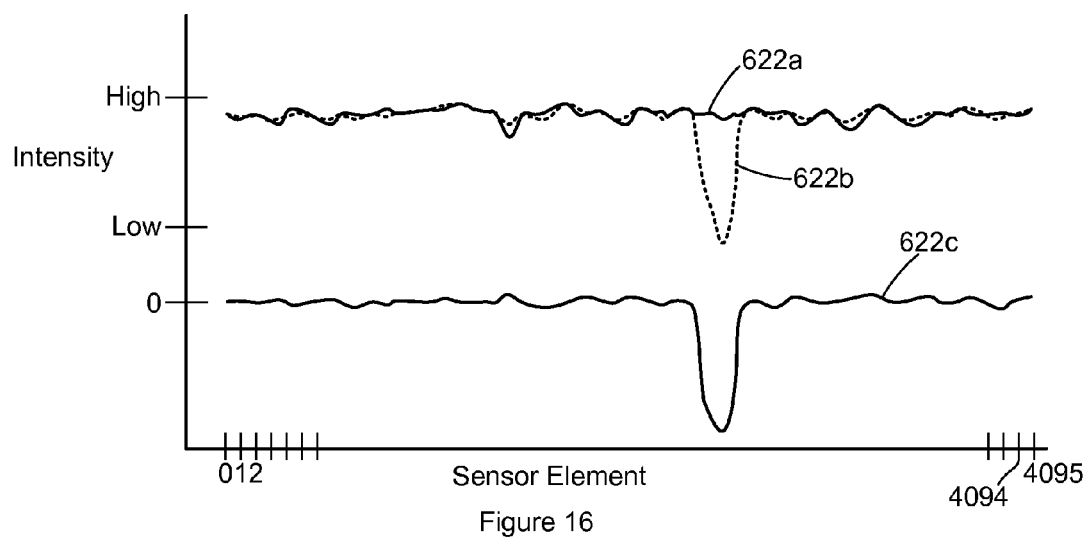
FIG. 16 illustrates intensity signals in another embodiment of the present invention.

In other embodiments, the intensity of radiation reaching the sensor elements 516 from radiation sources 562 may vary more significantly. FIG. 16 illustrates several raw intensity signals from a sensor in an embodiment where the radiation intensity level across the sensor elements has not been balanced. Intensity signal 622a illustrates the relatively high variability of radiation that is incident on different sensor elements in the absence of any radiation blocking object such as a pen. Intensity signal 622b illustrates the effect of using a radiation block object to block radiation from radiation sources 562 from reaching some of the sensor elements. In this embodiment, the processor records the intensity signal 622a during a start-up phase of the whiteboard system and uses the recorded intensity signal as a baseline. During ongoing operation, the intensity signal, such as intensity signal 622b, received from the sensor array is compared to the recorded baseline intensity signal to identify changes in the intensity signal. The difference between the baseline intensity signal 622a and intensity signal 622b is shown as differential intensity signal 622c. Differential intensity signal 622c is used as a raw intensity signal to determine a threshold level and to identify a center sensor element.

The present invention has been described here by way of example only. Various modification and variations may be made to these exemplary embodiments without departing from the spirit and scope of the invention.

The invention claimed is:

1. A method of estimating the position of a radiation source relative to a sensing region, the method comprising:
   positioning a first position sensor in a first position relative to the sensing region, wherein the first position sensor comprises:
   a first linear array sensor having a plurality of first sensor elements, the first sensor elements facing the sensing region;
   a first aperture plate positioned between the first linear array sensor and the sensing region to block radiation from the sensing region from reaching the first linear array sensor;
   a first aperture formed in the first aperture plate to allow radiation from the radiation source to reach at least one of the first sensor elements;
   positioning a second position sensor in a second position relative to the plane, wherein the first and second position sensors are separated by a distance, wherein the second position sensor comprises:
   a second linear array sensor having a plurality of second sensor elements, the second sensor elements facing the sensing region;
   a second aperture plate positioned between the second linear array sensor and the sensing region to block radiation from the sensing region from reaching the second linear array sensor;
   a second aperture formed in the second aperture plate to allow radiation from the radiation source to reach at least one of the second sensor elements;
   receiving a first radiation intensity signal from the first linear array sensor, wherein the first intensity signal includes intensity value corresponding to radiation incident on the first sensor elements through the first aperture;
   determining a first ray relative to first position sensor based on the first intensity signal;
   receiving a second radiation intensity signal from the second linear array sensor, wherein the second intensity signal includes intensity value corresponding to radiation incident on the second sensor elements through the second aperture;
   determining a second ray relative to the second position sensor based on the second intensity signal;
   selecting a first center sensor element from the plurality of first sensor elements;

selecting a second center sensor element from the plurality of second sensor elements;

determining the first ray based on the first center sensor element determining the second ray based on the second center sensor element; and estimating the position of the radiation source to be at the intersection of the first and second rays.

2. The method of claim 1 wherein the sensing region is a surface of a display screen.

3. The method of claim 1 wherein the sensing region is a surface of a writing surface.

4. The method of any claim 1 wherein the radiation source is an active radiation source that emits radiation detectable by the first and second position sensors.

5. The method of claim 1 wherein the radiation source is a passive reflective radiation and further including providing one or more active radiation sources in a fixed position, and wherein the passive radiation source reflects radiation from the active radiation sources onto the first and second position sensors.

6. The method of claim 1 wherein the first radiation intensity signal includes at least one first signal high intensity value exceeding a first threshold value, and wherein the first ray is determined based on the at least one first signal high intensity value.

7. The method of claim 1 wherein the second radiation intensity signal includes at least one second signal high intensity value exceeding a second threshold value, and wherein the second ray is determined based on the at least one second signal high intensity value.

8. The method of claim 1 wherein the first radiation intensity signal includes a first range of high intensity values exceeding a first threshold value, and wherein determining the first ray includes:

selecting the first center sensor element based on the first range of high intensity values; and determining the first ray based on the first center sensor element.

9. The method of claim 1 wherein the second radiation intensity signal includes a second range of high intensity values exceeding a second threshold value, and wherein determining the second ray includes:

selecting the second center sensor element based on the second range of high intensity values; and determining the second ray based on the second center sensor element.

10. The method of claim 1 wherein the first radiation intensity signal includes at least one first signal low intensity value below a first threshold value, and wherein the first ray is determined based on the at least one first signal low intensity value.

11. The method of claim 1 wherein the second radiation intensity signal includes at least one second signal low intensity value below a second threshold value, and wherein the second ray is determined based on the at least one second signal low intensity value.

12. The method of claim 1 wherein the first radiation intensity signal includes a first range of low intensity values below a first threshold value, and wherein determining the first ray includes:

selecting the first center sensor element based on the first range of low intensity values; and determining the first ray based on the first center sensor element.

13. The method of claim 1 wherein the second radiation intensity signal includes a second range of low intensity values below a second threshold value, and wherein determining the second ray includes:

selecting the second center sensor element based on the second range of low intensity values; and determining the second ray based on the second center sensor element.

14. The method of claim 1 wherein the first radiation intensity signal is a first analog radiation intensity signal and wherein determining the first ray includes:

converting the first analog radiation intensity signal into a corresponding first final radiation intensity; and determining the first ray based on the first final radiation intensity signal.

15. The method of claim 1 wherein the second radiation intensity signal is a second analog radiation intensity signal and wherein determining the second ray includes:

converting the second analog radiation intensity signal into a corresponding second final radiation intensity; and determining the second ray based on the second final radiation intensity signal.

16. The method of claim 1 wherein the first radiation intensity signal is a digital signal having either a high value or a low value corresponding to each of the first sensor elements and wherein determining the first ray includes:

selecting the first center sensor element based on a first range of high intensity values; and determining the first ray direction based on the first center sensor element.

17. The method of claim 1 wherein the second radiation intensity signal is a digital signal having either a high value or a low value corresponding to each of the second sensor elements and wherein determining the second ray includes:

selecting the second center sensor element based on a second range of high intensity values; and determining the second ray direction based on the second center sensor element.

18. The method of claim 1 wherein the first radiation intensity signal is a digital signal having either a high value or a low value corresponding to each of the first sensor elements and wherein determining the first ray includes:

selecting the first center sensor element based on a first range of low intensity values; and determining the first ray direction based on the first center sensor element.

19. The method of claim 1 wherein the second radiation intensity signal is a digital signal having either a high value or a low value corresponding to each of the second sensor elements and wherein determining the second ray includes:

selecting the second center sensor element based on a second range of low intensity values; and determining the second ray direction based on the second center sensor element.

20. The method of claim 1 including filtering the radiation intensity signal to remove spurious values before determining first ray.

21. The method of claim 1 including filtering the radiation intensity signal to remove spurious values before determining second ray.

22. The method of claim 1 wherein determining the first ray includes looking up an angle in a first lookup table.

23. The method of claim 1 wherein determining the second ray includes looking up an angle in a second lookup table.

24. The method of claim 1 wherein determining the first ray includes calculating an angle.

25. The method of claim 1 wherein determining the second ray includes calculating an angle.

\* \* \* \* \*